(12) United States Patent
Rose (10) Patent No.: US 8,132,536 B2
(45) Date of Patent: Mar. 13, 2012

(54) PORTABLE AND COLLAPSIBLE HOUSING FOR POULTRY OR OTHER ANIMALS

(76) Inventor: Steven M. Rose, Walpole, MA (US)

( * ) Notice: Subject to any disclaimer, the term of this patent is extended or adjusted under 35 U.S.C. 154(b) by 341 days.

(21) Appl. No.: 12/362,727

(22) Filed: Jan. 30, 2009

(65) Prior Publication Data

US 2010/0192869 A1    Aug. 5, 2010

(51) Int. Cl.
*A01K 31/06* (2006.01)
*A01K 31/08* (2006.01)

(52) U.S. Cl. .................... 119/461; 119/472; 119/474

(58) Field of Classification Search .............. 119/416, 119/431, 452, 461, 463, 472, 474, 482, 498, 119/499, 513, 514, 519, 522
See application file for complete search history.

(56) References Cited

U.S. PATENT DOCUMENTS

| | | |
|---|---|---|
| 415,769 A | 11/1889 | Drewitt |
| 1,013,233 A | 1/1912 | Stout et al. |
| 1,031,359 A | 7/1912 | Mehringer |
| 1,040,489 A | 10/1912 | Baker |
| 1,215,740 A | 2/1917 | Steiner |
| 1,303,736 A | 5/1919 | Spelcher |
| 1,345,968 A | 7/1920 | Spelcher |
| 1,703,625 A | 2/1929 | Jackson |
| 1,759,770 A | 5/1930 | Whetstone |
| 1,771,492 A | 7/1930 | Karlson |
| 1,941,662 A | 1/1934 | Cunningham |
| 2,383,326 A | 8/1945 | Lovell |
| 2,445,055 A | 7/1948 | Capaul |
| 2,601,844 A | 7/1952 | Lovell |
| 2,611,338 A | 9/1952 | Yellin |
| 2,712,677 A | 7/1955 | Hyde |
| 2,785,822 A * | 3/1957 | Kus .............................. 220/4.28 |
| 2,970,567 A | 2/1961 | Rubin |
| 3,048,147 A | 8/1962 | McKean |
| 3,087,459 A | 4/1963 | Dirck |
| 3,141,566 A | 7/1964 | Carpenter |
| 3,144,852 A | 8/1964 | Messeas |
| 3,330,434 A | 7/1967 | Bromley |
| 3,545,406 A | 12/1970 | Osborn |
| 3,593,689 A | 7/1971 | Van Huis |
| 3,768,442 A | 10/1973 | Van Huis |
| 3,774,576 A | 11/1973 | Moore |
| 3,777,710 A | 12/1973 | Rhinehart |
| 3,783,829 A | 1/1974 | Siciliano |

(Continued)

OTHER PUBLICATIONS

Examples of poultry shelter and cage products for sale from the www.mcmurrayhatchery.com on-line catalog.

(Continued)

*Primary Examiner* — Kristen Hayes
(74) *Attorney, Agent, or Firm* — Burns & Levinson, LLP; Jacob N. Erlich, Esq.; Marlo Schepper (57) ABSTRACT

A portable and collapsible housing for poultry or other animals that includes a shelter having a half-lap shape, a base cage having a complimentary half-lap shape, a means for joining the shelter onto the base cage to form the housing is disclosed. A space in the shelter and a space in the base cage communicate with each other through an opening in the shelter. The housing further includes a door frame, at least one door, at least one cantilevered rod, and a ramp. The shelter is transformable into a box shaped container for shipping or storage.

20 Claims, 8 Drawing Sheets

U.S. PATENT DOCUMENTS

| | | |
|---|---|---|
| 3,791,347 A | 2/1974 | Lovell |
| 3,796,189 A | 3/1974 | Blondeel |
| 3,866,577 A | 2/1975 | Mathis |
| 3,896,766 A | 7/1975 | Martin |
| 3,903,851 A | 9/1975 | Van Huis |
| 3,930,467 A | 1/1976 | Fier |
| 3,993,026 A | 11/1976 | Shreckhise |
| 3,994,260 A | 11/1976 | Fleshman |
| 3,996,896 A | 12/1976 | Slaats |
| 4,008,690 A | 2/1977 | Van Huis |
| 4,020,793 A | 5/1977 | Morrison |
| 4,060,055 A | 11/1977 | Skinner |
| 4,112,872 A | 9/1978 | Van Huis |
| 4,140,080 A | 2/1979 | Snader |
| 4,195,592 A | 4/1980 | Siciliano |
| 4,212,269 A | 7/1980 | White et al. |
| 4,321,887 A | 3/1982 | Martin et al. |
| 4,367,694 A | 1/1983 | Goyheneix |
| 4,480,588 A | 11/1984 | Holladay et al. |
| 4,527,512 A | 7/1985 | Sugiura |
| 4,574,737 A | 3/1986 | Bugeja |
| 4,653,430 A | 3/1987 | Mass et al. |
| 4,697,547 A | 10/1987 | Malestein |
| 4,793,286 A | 12/1988 | Buxton |
| 4,803,952 A | 2/1989 | Houser |
| 4,869,206 A | 9/1989 | Spina |
| 4,917,047 A | 4/1990 | Wazeter, III |
| 5,010,848 A | 4/1991 | Rankin |
| 5,036,797 A | 8/1991 | Koozer |
| 5,121,710 A | 6/1992 | Gonzalez |
| 5,570,657 A | 11/1996 | Kuhlmann |
| 5,626,098 A | 5/1997 | Askins et al. |
| 5,660,291 A | 8/1997 | Dash |
| 5,678,509 A | 10/1997 | Dillon |
| 5,803,018 A | 9/1998 | Liou |
| 5,862,778 A | 1/1999 | Matsumoto |
| 5,950,568 A | 9/1999 | Axelrod et al. |
| 6,032,614 A * | 3/2000 | Tominaga ............... 119/452 |
| 6,067,939 A * | 5/2000 | Tominaga ............... 119/500 |
| 6,192,834 B1 | 2/2001 | Kolozsvari |
| 6,631,590 B1 | 10/2003 | Glowaski |
| 6,659,045 B2 * | 12/2003 | Thompson ............... 119/482 |
| 6,681,720 B1 | 1/2004 | Skurdalsvold et al. |
| 6,877,269 B2 * | 4/2005 | Schultz ............... 43/55 |
| 6,895,898 B1 | 5/2005 | Kitch |
| 6,968,807 B2 | 11/2005 | Kuhlmann |
| 2004/0107916 A1 * | 6/2004 | Takimoto ............... 119/474 |
| 2005/0076854 A1 * | 4/2005 | Passno et al. ............... 119/500 |

OTHER PUBLICATIONS

Example of poultry shelter and cage product for sale from the www.henspa.com on-line catalog.

* cited by examiner

PORTABLE AND COLLAPSIBLE HOUSING FOR POULTRY OR OTHER ANIMALS

FIELD OF THE INVENTION

The present invention relates to a housing for animals, and more particularly to a portable and collapsible housing for poultry or other animals.

BACKGROUND OF THE INVENTION

People have been raising poultry for thousands of years. Poultry are raised for eggs, for meat, for educational or research purposes, for show, for enjoyment as pets or some combination.

There is an increasing public interest in raising small quantities of poultry. Some of the reasons driving this interest are animal welfare and health concerns regarding how commercial poultry are housed and what they are fed. Additionally, there is a growing public demand for organically raised poultry and eggs for their nutritional qualities.

Whether raised in an industrial facility or a private facility, poultry need housing to shelter them from weather and to protect them from predators. Poultry also need housing to nest, lay eggs, and to roost. In addition, food and water can be provided for poultry in housing.

People who are interested in raising poultry, such as chickens, are confronted with the problem of where to house and care for them. Figuring out how to economically and efficiently house poultry can be a major barrier to getting and raising poultry. When suitable housing is not available, people consider either building poultry housing or purchasing poultry housing.

Many cage or coop structures have been devised for housing poultry. Since the 1940s, the emphasis in the prior art has been on devising housing structures for use in raising large quantities of poultry. Furthermore, many such housing structures for poultry are intended for use inside another larger structure, such as a barn or building, rather than as a stand-alone outdoor structure.

A need therefore exists in the prior art for a new and improved housing structure for raising poultry.

SUMMARY OF THE INVENTION

The portable and collapsible housing described herein includes a rectangular prism shape and comprises a shelter portion, a base cage portion, a door apparatus, a ramp, upper and lower platforms and one or more cantilevered rods. The shelter and base cage portions each have a half-lap shaped configuration complimentary to one another that allows the shelter to mate with the complimentary half-lap shaped base cage to form the rectangular prism shaped portable and collapsible housing.

The shelter portion comprises a front shelter portion and back shelter portion defining a shelter interior and a shelter roof that prevents communication between the shelter interior and the exterior environment. The shelter roof top rests on coplanar top edges of the front shelter portion and back shelter portion when the front shelter portion and back shelter portion are in an assembled configuration forming the shelter portion of the portable and collapsible housing.

The front shelter portion comprises a front shelter first end wall, a shelter front wall, a front shelter second end wall, an upper platform, upper platform apertures, front shelter end wall apertures and shelter front wall apertures. The front shelter first end wall, shelter front wall, and front shelter second end wall are upstanding and are joined together with the shelter front wall therebetween to form a vertically oriented C-shaped wall. The shelter front wall is preferably longer horizontally than are the front shelter first and second end walls. The upper platform is configured to fit horizontally between the front shelter walls, is positioned slightly above and parallel with coplanar bottom edges of the upstanding front shelter walls thereby forming a downwardly extended lip beneath the upper platform in conjunction with each of the front shelter walls which extend below the upper platform, and is connected perpendicularly to the front shelter first end wall, shelter front wall, and shelter second end wall. The upper platform also includes a lip beneath the upper platform to provide a means to secure the shelter to the base cage by securing the shelter front wall to a front fastening rail on the base cage by a fastening means, such as screws, through apertures in the shelter front wall into the front fastening rail.

The back shelter portion comprises a back shelter first end wall, a shelter back wall, a back shelter second end wall, a lower platform, lower platform apertures, back shelter end wall apertures and shelter back wall apertures. The back shelter first end wall, shelter back wall, and back shelter second end wall are upstanding and are joined together with the shelter back wall therebetween to form a vertically oriented C-shaped wall. The shelter back wall is preferably longer horizontally than are the back shelter first and second end walls. The lower platform is configured to fit horizontally between the back shelter walls, is positioned slightly above and parallel with coplanar bottom edges of the upstanding back shelter walls thereby forming a downwardly extended lip beneath the lower platform in conjunction with each of the back shelter walls which extend below the lower platform, and is connected perpendicularly to the back shelter first end wall, shelter back wall, and back shelter second end wall. The lower platform also includes a lip beneath the lower platform to provide a means to secure the shelter to the base cage by securing the shelter back wall to a back fastening rail on the base cage by a fastening means, such as screws, through apertures in the shelter back wall into the back fastening rail.

The front shelter portion and back shelter portion are both box shaped. The front shelter is sized smaller than the back shelter in at least one dimension. The size differential between the front shelter and the back shelter permits the shelter to be configured into a half-lap shaped shelter when the front shelter and back shelter sections are fastened to one another. In this configuration the shelter will mate with the corresponding half-lap shaped base cage to form the housing. Additionally, the size differential allows the front shelter to be slidably disposed within the inside of the back shelter when the housing is collapsed and transformed into the rectangular box shaped container configuration for conveniently shipping or storage. Moreover, the size differential also allows the back shelter to partially overlap the front shelter so each shelter section can be secured to one another by a fastening means through aligned apertures in the front shelter and back shelter sections. The size differential allows for an opening below the front shelter and above the bottom of the back shelter after each shelter section is fastened to one another to form an upstanding assembled shelter with coplanar top edges. The door apparatus can thus be inserted in said opening and then secured to the front shelter and back shelter by a fastening means. The front shelter and back shelter are preferably formed or constructed of durable, rigid, lightweight sheet material, such as plastic, metal, wood or the like.

The base cage portion includes front and back cage portions. The front cage portion comprises front cage first end wall, a cage front wall, a front cage second end wall, a front fastening rail, a ramp, cage door hinges, cage door, a cage door opening and a cage door locking mechanism. Each cage wall of the front cage is vertically oriented and together forms a vertically oriented C-shaped wall. The cage front wall is positioned between and joined to the front cage first end wall and the front cage second end wall and is preferably longer horizontally than the front cage first and second end walls.

The back cage portion comprises a back cage first end wall, a cage back wall, a back cage second end wall and a back fastening rail. Each cage wall of the back cage is vertically oriented and together forms a vertically oriented C-shaped wall. The cage back wall is positioned between and joined to the back cage first and second end walls and is preferably longer horizontally than the back cage first and second end walls.

The front cage portion is sized larger than the back cage portion in at least one dimension. The size differential between the front cage and back cage forms a half-lap shaped base cage when the front cage and the back cage are fastened to one another by a cage fastening means, such as cage clips or ties. Thus, once both cage sections are fastened together, the half-lap shaped base cage and corresponding half-lap shaped shelter are joined together to form the housing. The front cage and back cage are preferably formed or constructed of a durable, rigid wire or plastic mesh material or the like.

The front fastening rail is secured to the front cage along the top inside edge of the cage front wall by a fastening means, such as staples or other fastening means, and extends above the top edge of the cage front wall. The back fastening rail is secured to the back cage along the top inside edge of the cage back wall, by a fastening means, such as staples or other fastening means, and extends above the top edge of the cage back wall. The front and back fastening rails provide a means of fastening the base cage to the shelter and also adds structural strength to the housing. The assembled shelter is joined together with the assembled base cage by placing the shelter on the front and back fastening rails and securing the shelter to the base cage by a fastening means, such as screws, through a number of apertures in the shelter front and back walls into the front and back fastening rails. The front and back fastening rails are preferably formed or constructed of durable, rigid, lightweight material, such as plastic, metal, wood or the like.

A ramp is provided in the base cage section and is secured by a cage fastening means, such as clips or ties, near to the bottom of the front cage first end wall and the other end of the ramp is secured to the front cage second end wall near to the bottom a door frame so the ramp slopes up longitudinally across the base cage. The ramp provides a path for poultry or other animals to move freely up and down between the shelter and the base cage. Poultry or other animals can thereby spend time in the well-ventilated base cage space and can also spend time in the shelter for such activities as feeding, watering, nesting, roosting and sleeping. In addition, the ramp also provides a device on which poultry or other animals can get some exercise while confined in the housing. The ramp is preferably made from a rigid wire or plastic mesh material or the like so animal excrement will fall through it.

The cage front wall contains a cage door opening and cage door to allow poultry or other animals to enter and exit the housing interior. The cage door and cage door opening are preferably positioned within a lower quadrant of the cage front wall below the higher end of the diagonally sloped ramp, described above. This configuration allows poultry or other animals to move into or out of the housing through the cage door opening without the ramp obstructing the way. The cage door is locked by at least one cage door locking mechanism so as to prevent poultry or other animals from escaping the housing and prevent predators from entering the housing. The cage door is preferably made of a rigid wire mesh or plastic mesh.

Hinges for the cage door are preferably formed by allowing a plurality of wire ends to protrude out from one vertical side of the cage door. The hinges for the cage door are then formed by bending the plurality of protruding wire ends on the cage door around a vertical wire edge of the cage door opening formed in the cage front wall. The cage door then swings out pivoting on the vertical wire edge of the cage door opening.

The shelter also contains a door frame and one or more doors. The door frame comprises a frame first end stile, a frame top rail, a frame second end stile, a frame bottom rail, frame supports, frame apertures, frame grooves and shank. The door frame is positioned between the upper platform and the lower platform and is secured by a fastening means, such as screws. The door frame is fastened via: (a) apertures along an edge of the lower platform of the back shelter into the frame bottom rail, (b) apertures along an edge of the back shelter first end wall and back shelter second end wall into the frame first end stile and frame second end stile, and (c) apertures in the frame top rail into apertures along an edge of the upper platform of the front shelter.

In one embodiment, the shank of each fastener that goes through the apertures in the frame top rail and the upper platform is sized and dimensioned to protrude sufficiently above the upper platform to allow each cantilevered rod to be mounted over each shank. Thus, no additional hardware is required to mount each cantilevered rod.

The first door and second door preferably slide into and out of the door frame horizontally along inward facing grooves in the frame top and bottom rails of the door frame so each door can be fully closed, partially opened, fully opened or fully removed, as needed.

Each cantilevered rod includes a rod portion, a cantilevered rod aperture portion and a cantilevered rod brace. A plurality of cantilevered rods can be provided in the shelter to allow poultry or other animals to roost, sleep, or to climb onto for exercise. Preferably each cantilevered rod is: (a) positioned horizontally, (b) mounted over the shank which protrudes up from the upper platform near the edge of the upper platform through an aperture at one end of each cantilevered rod, (c) cantilevered from the edge of the upper platform with the support of the cantilevered rod brace and (d) cantilevered over the lower platform. Thus, when poultry roost or sleep on each cantilevered rod their excrement will conveniently fall onto the lower platform where excrement absorbing litter, such as straw or wood shavings, is placed. Each cantilevered rod, being of minimal length, can be advantageously immersed into an average size water container, such as a bucket or sink, so each rod can be cleaned easily.

The foregoing summary provides an introduction to the present invention. To fully appreciate the many objects and advantages of the present invention as well as the invention itself, all of which will become apparent to those skilled in the art, the following detailed description of the invention and the claims should be read in conjunction with the accompanying drawings.

BRIEF DESCRIPTION OF THE DRAWINGS

The present invention will be more fully described and better understood from the following description of the preferred embodiment taken in conjunction with the accompanying drawings, wherein.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of elements described without departing from the scope of the invention as set forth in the appended claims.

Figure 1:
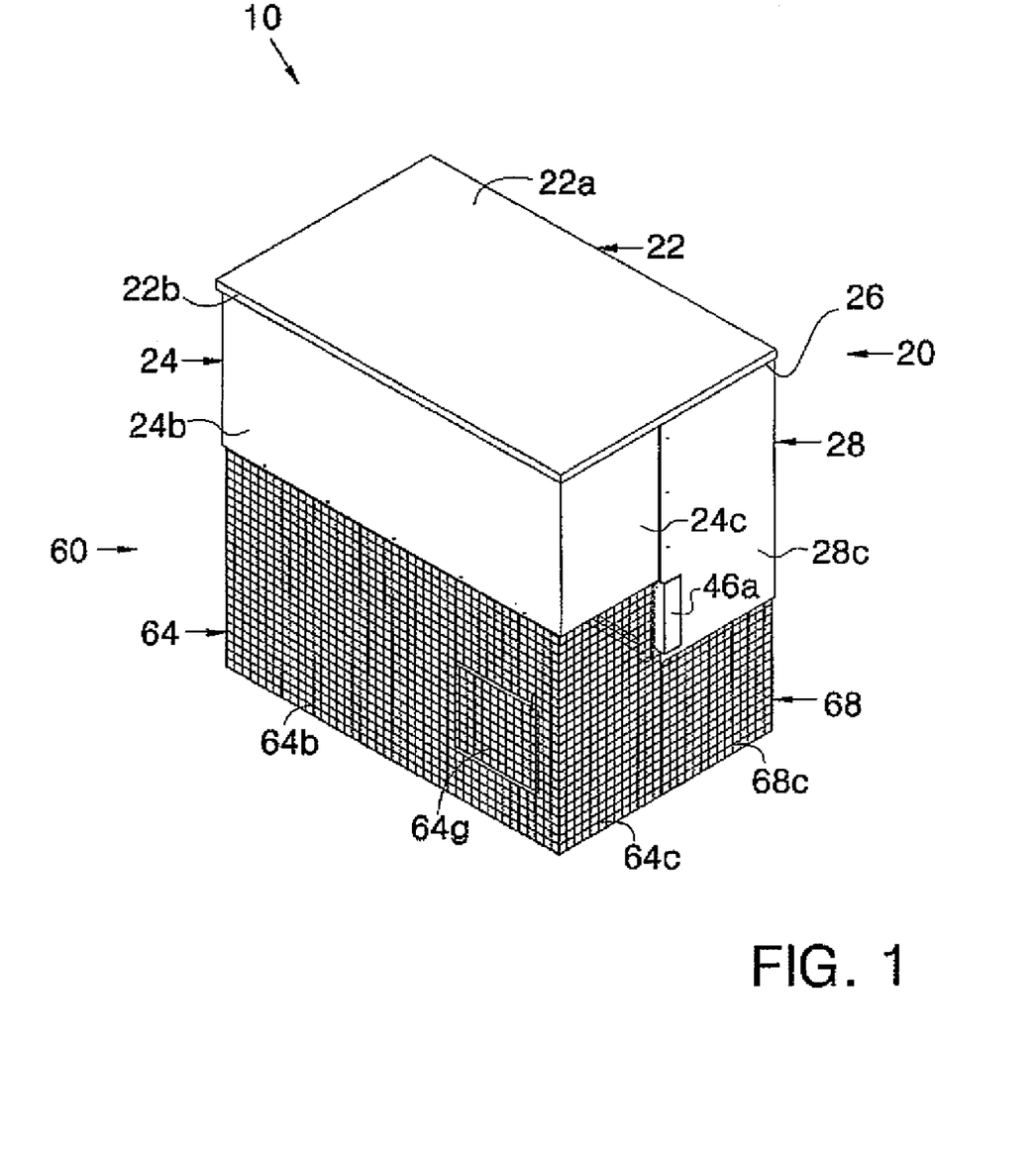
FIG. 1 is a pictorial view of a portable and collapsible housing in an assembled configuration according to an embodiment of the present invention.

FIG. 1 provides a perspective view of portable and collapsible housing 10 in accordance with the present invention. Portable and collapsible housing 10 includes two interior volumes formed by a shelter 20 and base cage 60 that are in communication with one another. In addition, shelter 20 and base cage 60 also have corresponding and complimentary half-lap shapes that are designed to mate with one another in order for the two interior volumes to communicate. When shelter 20 and base cage 60 are joined together, half-lap to half-lap, they form a generally rectangular prism shape or box-like shape, the interior of which is comprised of the two communicating interior volumes. The interior of housing 10 is thus able to provide housing for various animals including poultry.

Figure 2:
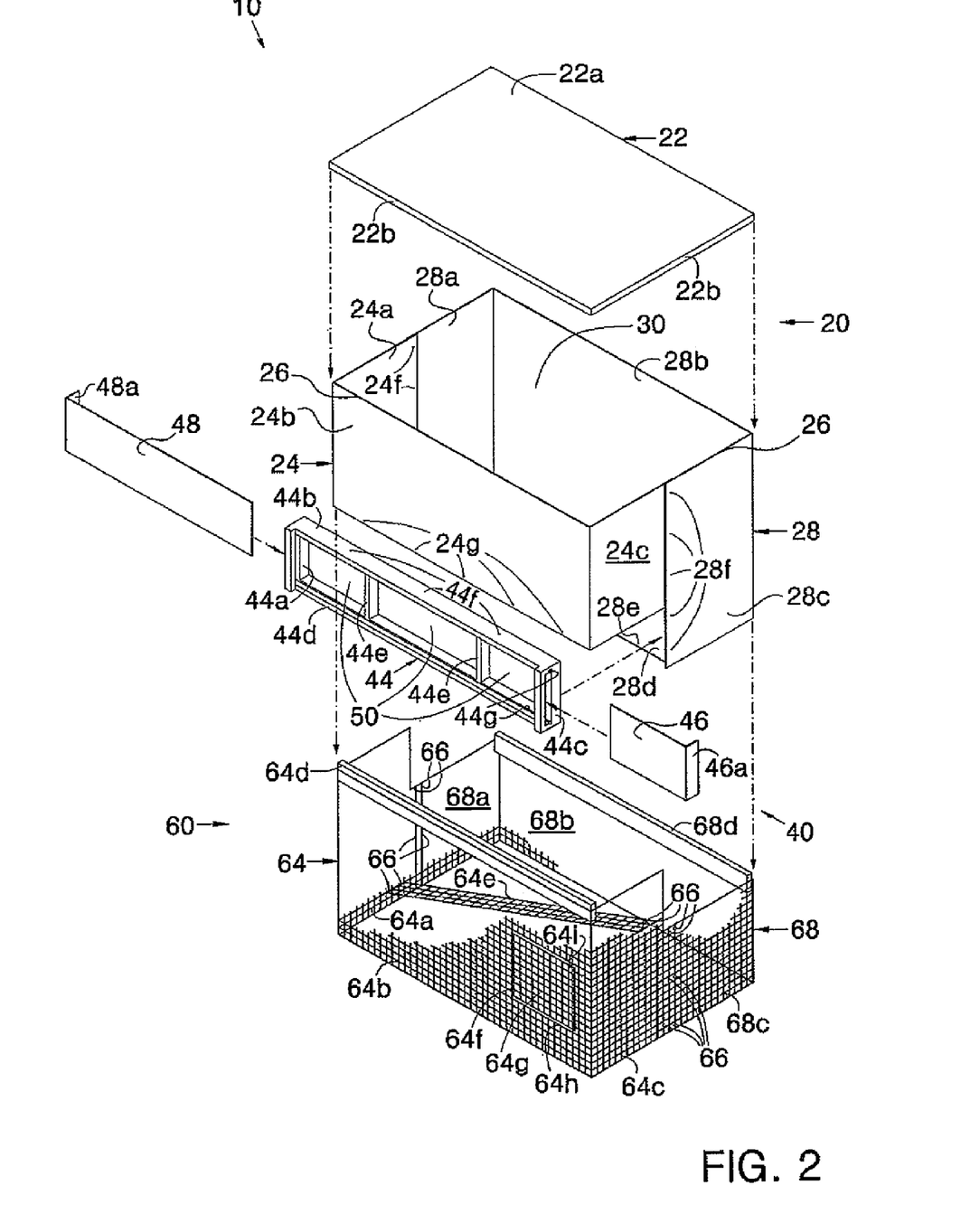
FIG. 2 is an exploded pictorial view of the portable and collapsible housing in the assembled configuration according to an embodiment of the present invention.
Figure 3:
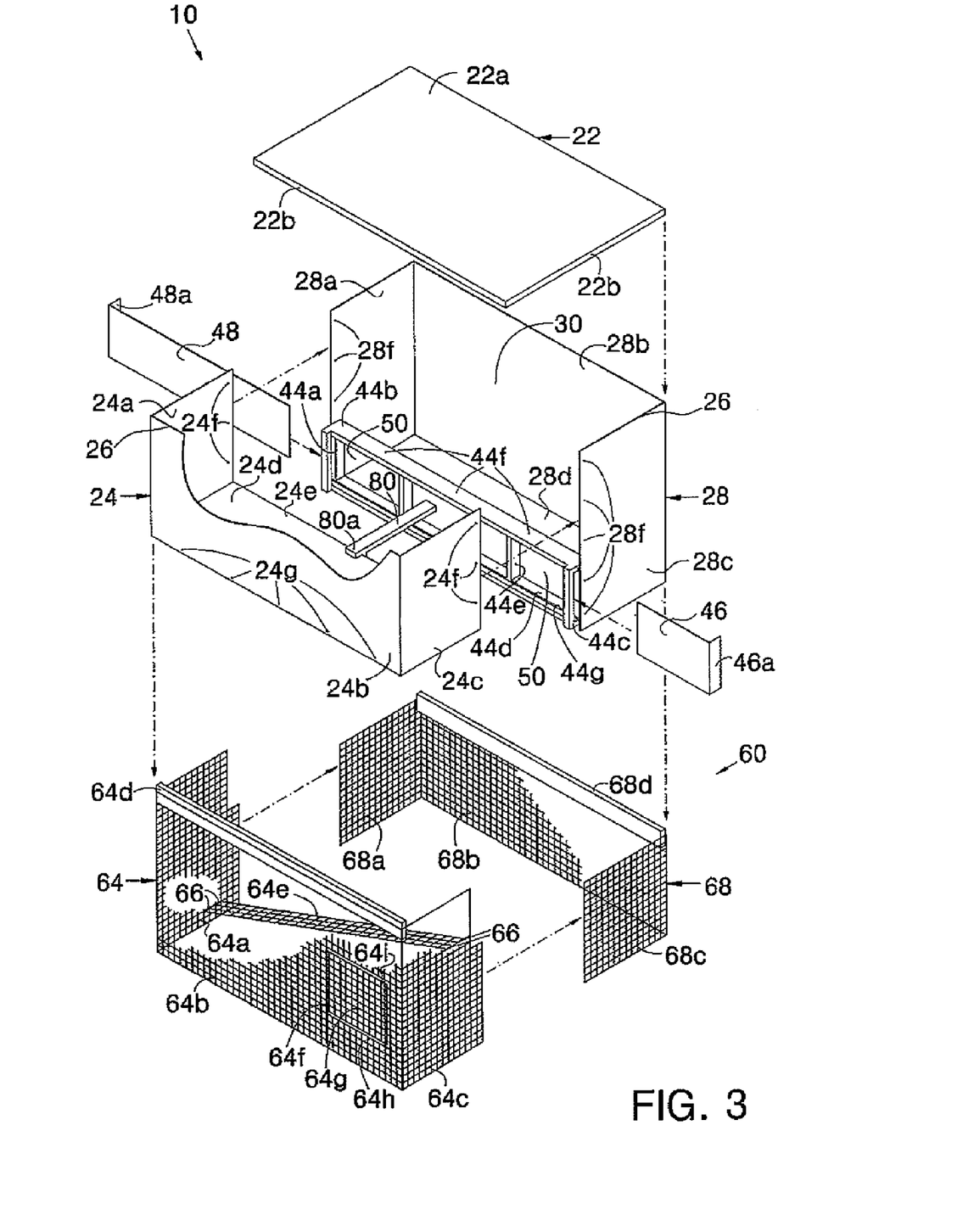
FIG. 3 is a further exploded pictorial view of the portable and collapsible housing in the assembled configuration according to an embodiment of the present invention.

In general, as depicted in FIGS. 1, 2, and 3) shelter 20 includes a shelter roof 22, a front shelter 24, and a back shelter 28. Front shelter 24 is comprised of a front shelter first end wall 24a, shelter front wall 24b, and front shelter second end wall 24c. Back shelter 28 includes a back shelter first end wall 28a, shelter back wall 28b, and back shelter second end wall 28c. In addition, front shelter 24 and back shelter 28 each have a top surface and when joined together form a planar top rim 26 that surrounds an upper opening 30 that provides communication between the interior space of shelter 20 and the exterior environment.

Shelter roof 22 is preferably rectangular and planar in shape and is dimensioned and configured to rest horizontally on top rim 26 formed from front shelter 24 and back shelter 28 when in an assembled configuration, as illustrated in FIG. 1. Shelter roof 22 is configured to cover upper opening 30 formed when front shelter 24 and back shelter 28 are assembled together. In this configuration shelter roof 22 prevents communication between the exterior environment and the interior space described above. Shelter roof 22 includes a shelter roof top portion 22a and a shelter roof lips portion 22b. Shelter roof lips portion 22b is formed on the peripheral edge portion of shelter roof top portion 22a and may extend downward to provide additional coverage and protection of the interior space from the exterior environment. Shelter roof 22 may be constructed entirely or partially of translucent or transparent molded plastic material in order to let light into shelter 20, although other suitable materials that provide the necessary shelter and structural integrity may also be used, including but not limited to metal, wood, and opaque plastics or other polymers.

The interior of front shelter 24 is defined by front shelter first end wall 24a, shelter front wall 24b, and front shelter second end wall 24c that together define an integrally formed vertical C-shaped wall. The interior of front shelter 24 may include structures that provide structural support for housing 10 and other structures for use by poultry or other animals kept in housing 10. In one embodiment depicted in FIGS. 2, 3, 6, and 7 the interior of front shelter 24 may include an upper platform 24d, upper platform apertures 24e, front shelter end wall apertures 24f and shelter front wall apertures 24g.

Upper platform 24d is positioned horizontally and is joined, extending outward from the walls and into the interior space, to front shelter vertical walls 24a, 24b and 24c slightly above and parallel to bottom edge portions of walls 24a, 24b and 24c so that a downward protruding lip is formed below upper platform 24d sufficient to secure shelter 20 to base cage 60 by a fastening means, such as screws. Upper platform 24d is sized and configured to provide sufficient space onto which such items such as a water container, a feed container and a nest can be located. This allows for ease of access for attending to each item by easily lifting, sliding or removing shelter roof 22 to obtain access to the shelter interior.

The interior of back shelter 28 is defined by back shelter first end wall 28a, shelter back wall 28b, and back shelter second end wall 28c that together define an integrally formed vertical C-shaped wall. The interior of back shelter 28 may include structures that provide structural support for housing 10 and various other structures for use by the poultry or other animals kept in housing 10. In one embodiment depicted in FIGS. 2, 3, 6, and 7, the interior of back shelter 28 may include lower platform 28d, lower platform apertures 28e, back shelter end wall apertures 28f and shelter back wall apertures 28g.

Lower platform 28d is positioned horizontally and is joined, extending outward from the walls and into the interior space, to back shelter vertical walls 28a, 28b and 28c slightly above and parallel to bottom edge portions of walls 28a, 28b and 28c so that a downward protruding lip is formed below lower platform 28d sufficient to secure shelter 20 to base cage 60 by a fastening means, such as screws Although front shelter 24 and back shelter 28 may be constructed of molded plastic materials, it should be understood that front shelter 24 and back shelter 28 could also be constructed of other materials, such as aluminum sheeting or wood or other materials that provide sufficient structural integrity, light weight, and ease of manufacture.

In one embodiment, front shelter 24 and back shelter 28 are joined together to define the shelter interior space by: (a) positioning front shelter 24 and back shelter 28 so that horizontal top edge portions of front shelter 24 and back shelter 28 form top rim 26, (b) positioning each shelter section so that shelter front wall 24b is positioned opposite to shelter back wall 28b with the open sides of front shelter 24 and back shelter 28 facing each other, (c) positioning front shelter 24 and back shelter 28 together so that vertical edge portions of back shelter first and second end walls 28a and 28c overlap adjacent vertical edge portions of front shelter first and second end walls 24a and 24c and (d) passing a fastening means, such as screws, through aligned apertures 24f and 28f contained in each vertical edge portion whereby front shelter 24 and back shelter 28 will be attached along said vertical edge portions.

As discussed above, front shelter 24 and back shelter 28 when joined together form a rectangular and coplanar top edge 26 onto which shelter roof 22 rests. Front shelter 24 is dimensionally smaller than back shelter 28. This (a) allows sufficient rectangular open space below front shelter 24 to fit door frame 44 between upper platform 24d, lower platform 28d, back shelter first end wall 28a and back shelter second end wall 28c, (b) allows back shelter 28 to overlap front shelter 24 so the two shelter sections can be secured by a fastening means such as screws, (c) allows front shelter 24 and back shelter 28 when fastened to one another to form half-lap shaped shelter 20 for joining with corresponding half-lap shaped base cage 60 (discussed in more detail below) and (d) allows front shelter 24 to fit inside back shelter 28 when shelter 20 is collapsed into a box shaped container configuration for shipping or storage.

As depicted in FIGS. 1, 2, and 3 base cage 60 includes a front cage 64 and a back cage 68 that together define an interior space in which to hold poultry or other animals. Front cage 64 includes a front cage first end wall 64a, a cage front wall 64b, and a front cage second end wall 64c that together define an integrally formed vertical C-shaped wall. Front cage 64 further includes a front fastening rail 64d, ramp 64e, cage door hinges 64f, cage door 64g, a cage door opening 6h defined within front wall 64b, and cage door locking mechanism 64i. Back cage 68 includes a back cage first end wall 68a, a cage back wall 68b, a back cage second end wall 68c that together define an integrally formed vertical C-shaped wall. Back cage 68 further includes a back fastening rail 68d. Accordingly, front cage 64 has an open top, an open bottom, and an open side opposite cage front wall 64b. Similarly, back cage 68 has an open top, an open bottom, and an open side opposite cage back wall 68b.

Front cage 64 is preferably constructed of a wire mesh material. Similarly, back cage 68 is also preferably constructed of a wire mesh material, although other materials may be used that provide the necessary structural integrity for the cages. If other solid materials are used to construct front and back cages 64, 68, a suitable number of air vent holes may be cut into the solid material to provide the necessary air flow.

Front cage 64 is dimensionally larger than back cage 68 so front cage 64 and back cage 68 when secured to one another by cage fastening means 66, such as cage clips or ties, together form half-lap shaped base cage 60 for joining with corresponding half-lap shaped shelter 20. In one embodiment, back cage 68 is configured and dimensioned to fit inside front cage 64 when base cage 60 is transformed into a collapsed configuration for shipping or storage.

As depicted in FIGS. 1, 2, and 3 front cage 64 and back cage 68 sections are joined to one another to form the half-lap shape by: (a) positioning each cage section so that cage front wall 64b is positioned opposite to cage back wall 68b with open sides of front cage 64 and back cage 68 facing each other, (b) positioning front cage 64 and back cage 68 together so that vertical edge portions of back cage first end wall 68a and back cage second end wall 68c overlap adjacent vertical edge portions of front cage first end wall 64a and front cage second end wall 64c and (c) securing adjacent cage walls together by cage fastening means 66, such as cage clips or ties, attached along said vertical edge portions.

As depicted in FIGS. 2 and 3, front fastening rail 64d is secured to the top edge portion of cage front wall 64b so that a portion of front fastening rail 64d extends above top edge portion of cage front wall 64b and a portion of front fastening rail 64d extends below top edge portion of cage front wall 64b. Front fastening rail 64d, may be fastened by a fastening means such as staples, ties, or other suitable means. Similarly, back fastening rail 68d is secured to the top edge portion of cage back wall 68b so that a portion of back fastening rail 68d extends above top edge portion of cage back wall 68b and a portion of back fastening rail 68d extends below top edge portion of cage back wall 68b. Back fastening rail 68d may be fastened by a fastening means such as staples or other suitable fastening means.

As shown in FIGS. 2 and 3, ramp 64e is preferably secured close to the lower portion of front cage first end wall 64a by cage fastening means 66, such as clips, ties, or other suitable fasteners and then ramp 64e is positioned so ramp 64e slopes upward from cage first end wall 64a and is secured onto the upper portion of front cage second end wall 64c by cage fastening means 66 such as clips, ties, or other suitable fasteners. Ramp 64e slopes up from front cage first end wall 64a and is secured to front cage second end wall 64c close to the bottom of door frame 44 to allow poultry or other animals to conveniently climb up from base cage 60 into shelter 20 or conversely down from shelter 20 into base cage 60.

Figure 5:
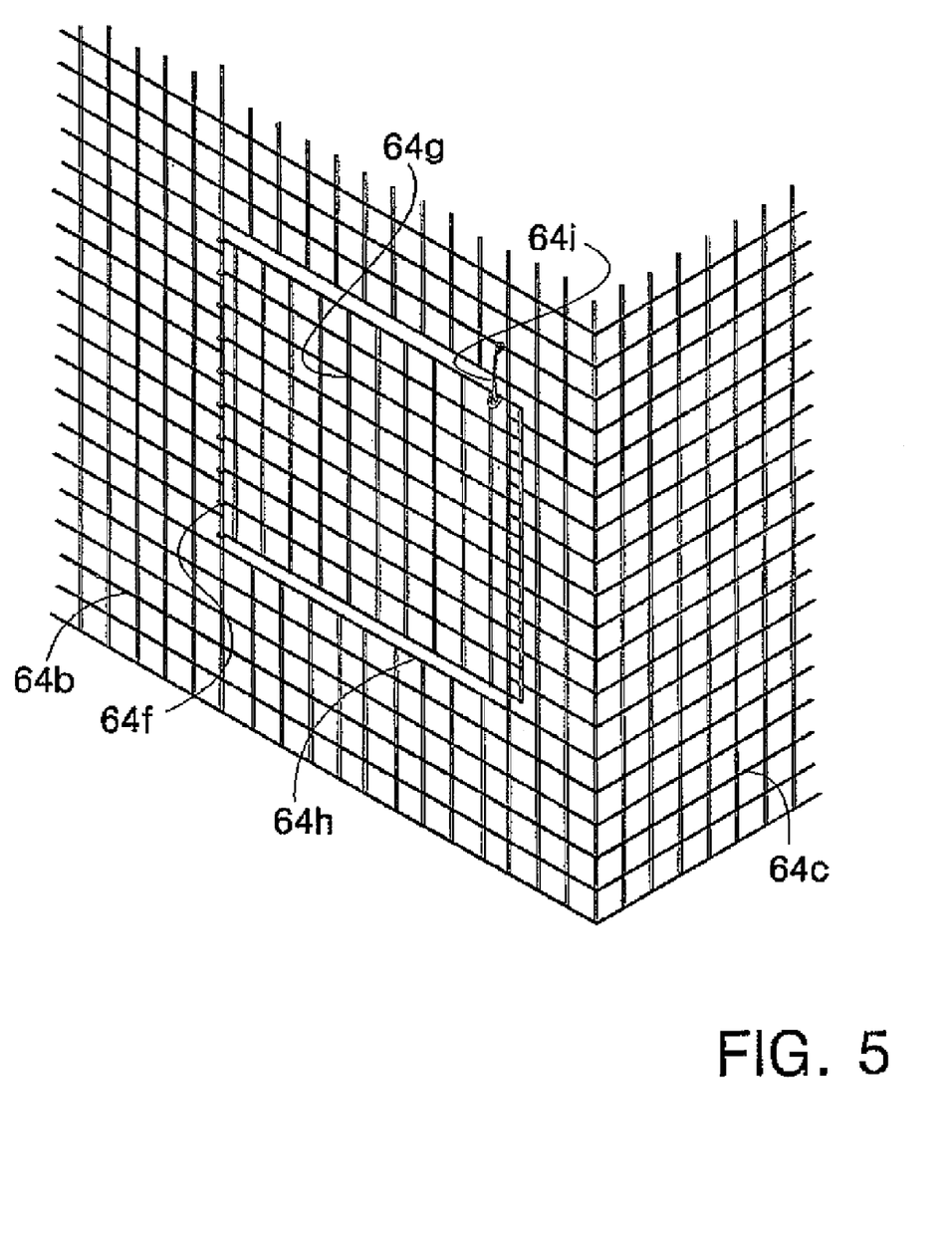
FIG. 5 is a perspective view of a cage door in a closed and locked position according to an embodiment of the present invention.

As shown in FIGS. 2, 3 and 5, cage front wall 64b includes a cage door opening 64h that is opened and secured by a cage door 64g. Cage door opening 64h is preferably positioned within a lower portion of cage front wall 64b near to where the higher end of sloped ramp 64e is secured to end wall 64c in order to allow poultry or other animals to enter or exit base cage 60 without being obstructed by ramp 64e. In this configuration, poultry or other animals are able to cross under ramp 64e when exiting or entering base cage 60, rather than crossing over or around ramp 64e. In one embodiment, cage door hinges 64f for cage door 64g may be fashioned from wire rods that are integral to cage door 64g and that protrude out from one side of cage door 64g. In this embodiment, cage door hinges 64f may be formed by bending the integral wire rods to form looped ends which are closed around wire rod edge portion of cage door opening 64h. Cage door 64g then pivots between an open and a closed position on wire rod edge portion of cage door opening 64h. Other forms of hinges 64f may be used as well as long as they provide suitable rotation of cage door 64g and sufficient structural integrity.

Cage door 64g can be locked to cage front wall 64b by cage door locking mechanism 64i which is secured to cage front wall 64b and which hooks onto cage door 64g. Other cage door locking mechanisms of known type may be used as well that include, but are not limited to, spring loaded wire hooks, clips, latches or a spring loaded clothes-pin like clasp.

Figure 4A:
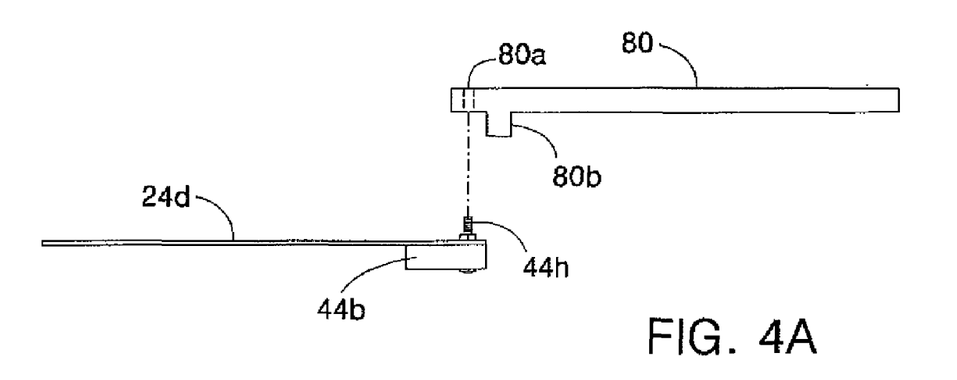
FIG. 4A is a side elevation view of a cantilevered rod positioned over a shank according to an embodiment of the present invention.
Figure 4B:
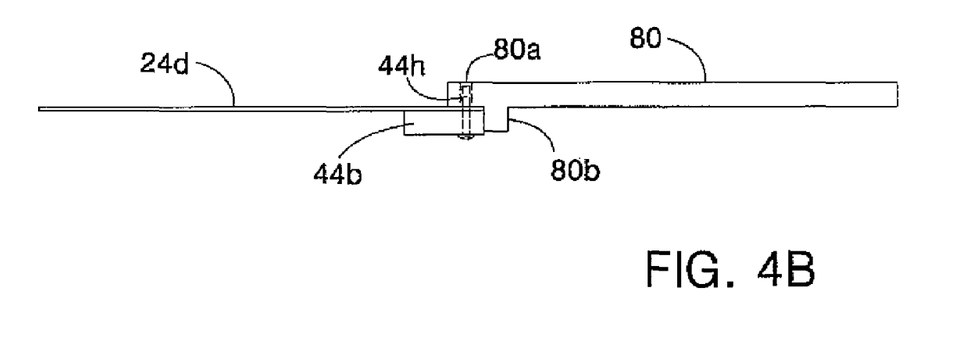
FIG. 4B is a side elevation view of the cantilevered rod mounted over the shank according to an embodiment of the present invention.
Figure 7:
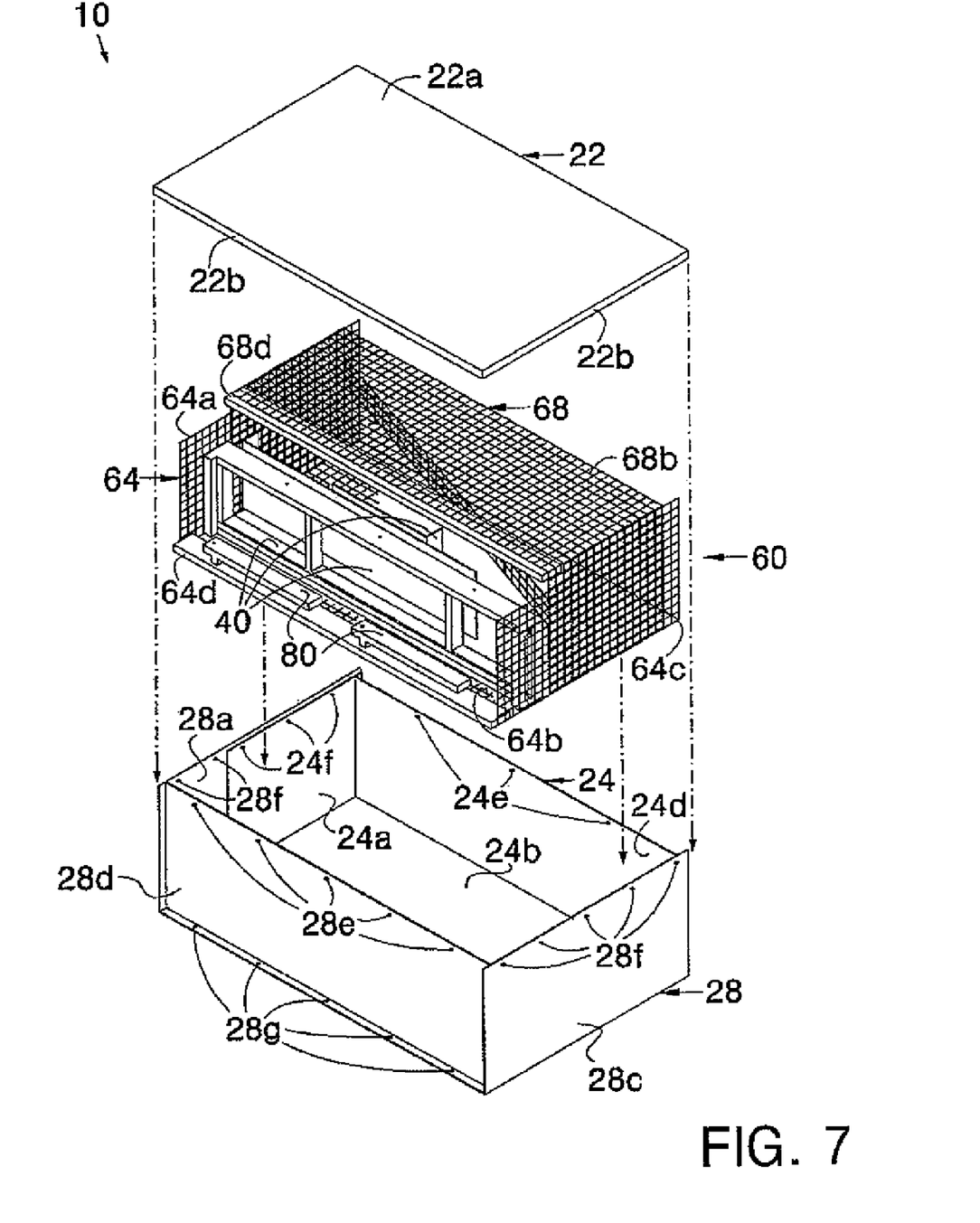
FIG. 7 is an exploded perspective view of the shelter, the base cage, a door apparatus and cantilevered rods of the portable and collapsible housing in the collapsed configuration for shipping or storage according to an embodiment of the present invention.

As depicted in FIGS. 2, 3, and 7, door apparatus 40 includes a door frame 44 that includes a frame first end stile 44a, frame top rail 44b, frame second end stile 44c, frame bottom rail 44d, frame supports 44e, frame apertures 44f, frame grooves 44g and shank 44h (depicted in FIGS. 4A and 4B). Door frame 44 is positioned and secured within the opening below front shelter 24. More specifically door frame 44 is positioned longitudinally and vertically within the opening between upper platform 24d and lower platform 28d and between back shelter first end wall 28a and back shelter second end wall 28c. Door frame 44 is secured to upper platform 24d by inserting a fastening means through frame apertures 44f which are in frame top rail 44b and then inserting same fastening means through upper platform apertures 24e allowing shank 44h of each fastening means to protrude up above upper platform 24d. As an added feature, shank 44h (depicted in FIGS. 4A and 4B) of each fastener that goes through apertures 44f in frame top rail 44b and through apertures 24e in upper platform 24d is sized and dimensioned to protrude sufficiently above upper platform 24d to allow a corresponding cantilevered rod to be mounted over each shank 44h (depicted in FIGS. 4A and 4B). In this embodiment, additional hardware is not required to mount a corresponding cantilevered rod.

Door frame 44 is secured to lower platform 28d by inserting a fastening means through lower platform apertures 28e into frame bottom rail 44d. Door frame 44 is secured to back shelter first end wall 28a by inserting a fastening means through back shelter end wall apertures 28f into frame first end stile 44a. Door frame 44 is secured to back shelter second end wall 28c by inserting a fastening means through back shelter end wall apertures 28f into frame second end stile 44c. Door frame 44 is fabricated preferably from a plastic material, but can also be fabricated from other materials such as wood or metal. Various fastening means may be used including clips, screws, nuts and bolts, ties, or other suitable fastening means.

Door frame 44 preferably includes vertical frame supports 44e, that in combination with frame first end stile 44a, frame top rail 44b, frame second end stile 44c, and frame bottom rail 44d, form door opening 50. Frame first end stile 44a and frame second end stile 44c each include an opening into which first door covering 46 and second door covering 48 are inserted. To facilitate the insertion of first and second door coverings 46, 48, frame top rail 44b, and frame bottom rail 44d each include grooves 44g that are cut or formed into the inside surface of each rail and that are facing one another. First door covering 46 and second door covering 48 are therefore able to slide within the frame grooves 44g to fully or partially close or open door opening 50, and thereby allow or prevent access to the interior of shelter 20. First door covering 46 and second door covering 48 are preferably fabricated from a plastic material, but can also be fabricated from other materials such as wood or metal. First door covering 46 includes first door handle 46a and second door covering 48 includes second door handle 48a. Both handles are preferably fabricated from a plastic material and in the embodiment in which first and second door coverings 46 and 48 are plastic, are formed as an integral part of first door covering 46 and second door covering 48. First and second door handles 46a and 48a provide for a means to pull or push first and second door coverings 46 and 48 in and out of door frame 44. First and second door handles 46a and 48a also act as a door stop as each door handle will allow each door to slide into door frame 44 only to where each handle meets frame first end stile 44a or frame second end stile 44c.

In one embodiment, first door covering 46 is preferably shorter horizontally than second door covering 48. Because first door covering 46 is shorter than second door covering 48, a smaller opening is created when first door covering 46 is fully opened, partially opened or fully removed while second door covering 48 is fully closed. The use of a smaller door opening helps to keep wind drafts out of shelter 20 and from disturbing the feed, water, and excrement absorbing litter from being blown about in shelter 20 or blown out of shelter 20. Both doors can be fully closed to retain warmer air during cold weather. By having two doors that can be fully opened, partially opened or fully removed also allows more fresh air to be let into shelter 20. Door frame 44 and first and second door coverings 46 and 48 are preferably formed or constructed of durable, rigid, lightweight material, such as plastic, metal, wood or the like. Other configurations may also be used, for example, other door combinations may be presented, such as with one door instead of two doors or doors that open and close in a different manner, e.g., cranked upward or outward, or sliding upward.

In addition, by closing first and second door coverings 46 and 48 poultry or other animals can be separated into base cage 60 while shelter 20 is being cleaned and maintained or, conversely, separated into shelter 20 while base cage 60 is being cleaned and maintained. Hence, the present invention advantageously provides housing that can be cleaned and maintained without the need to remove poultry or other animals.

As shown in FIGS. 3, 4A and 4B, one or more cantilevered rods 80 are provided and mounted in shelter 20. Cantilevered rods 80 are provided primarily for poultry to roost, or to climb onto to reach upper platform 24d, or used by poultry or other animals for other purposes such as for exercise or play. Each cantilevered rod 80 includes a cantilevered rod aperture 80a and cantilevered rod brace 80b. Each cantilevered rod 80 is mounted over a corresponding shank 44h that is disposed through cantilevered rod aperture 80a that is sized and configured to receive shank 44h that protrudes in an upward direction from upper platform 24d. Shank 44h is preferably an extended element of the same fastening means used to secure frame top rail 44b to upper platform 24d. Thus, the fastening means used to secure top rail 44b to upper platform 24d is used for two purposes: (a) to secure frame top rail 44b to upper platform 24d and (b) to support cantilevered rod 80. Cantilevered rod brace 80b, which is positioned underneath cantilevered rod 80 proximate to cantilevered rod aperture 80a, helps to support the weight of poultry or other animals. Cantilevered rod brace 80b is configured to abut frame top rail 44b and helps to support an animal by providing greater structural support for each cantilevered rod 80. Cantilevered rod 80 is disposed above lower platform 28d so that animal excrement will conveniently fall onto excrement absorbing litter (not shown) spread over lower platform 28d. Each cantilevered rod, being of a desired length, can be advantageously immersed into an average size water container, such as a bucket or sink, so each rod can be cleaned easily.

Figure 6:
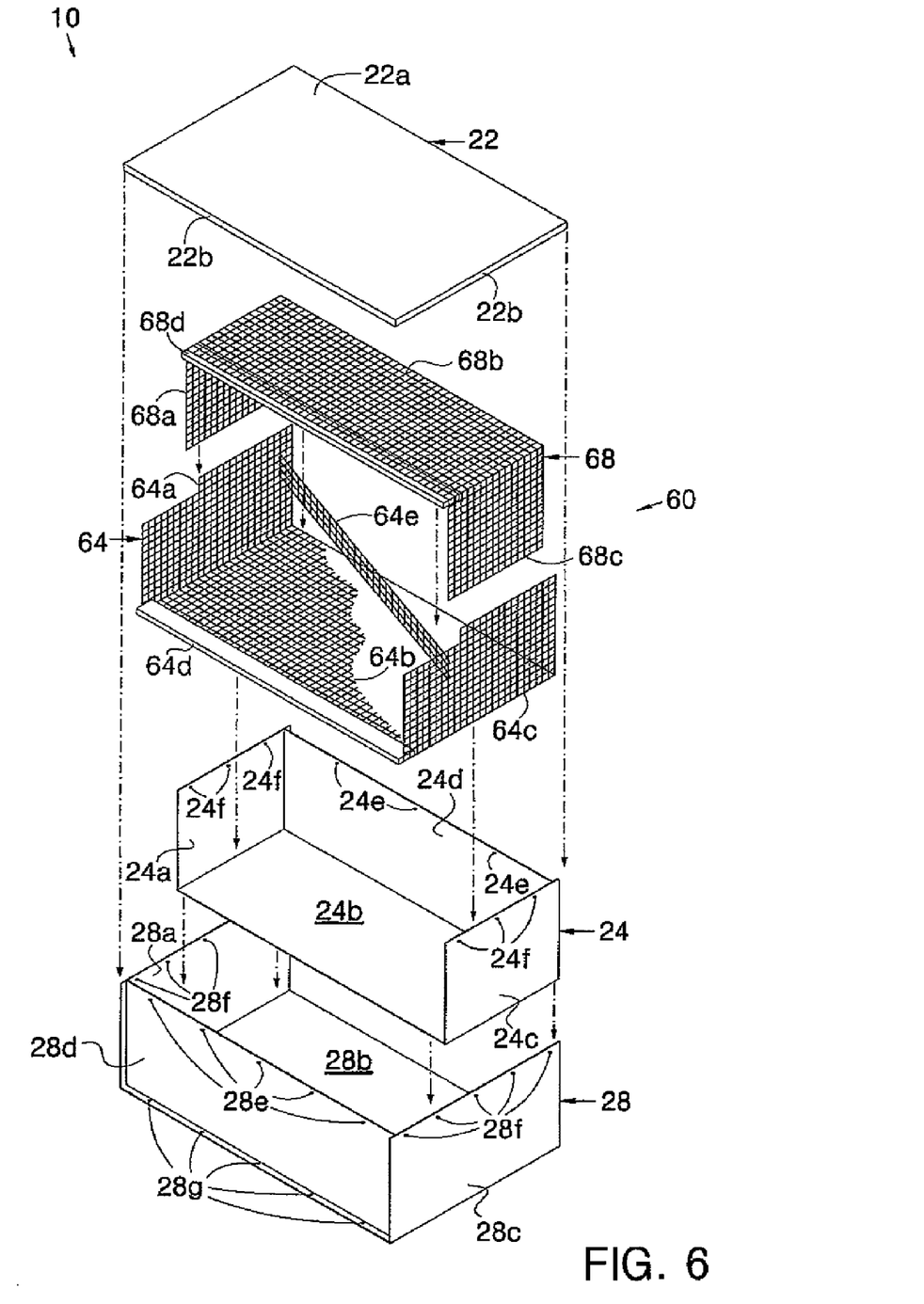
FIG. 6 is an exploded perspective view of a shelter and base cage in a collapsed configuration for shipping or storage according to an embodiment of the present invention.
Figure 8:
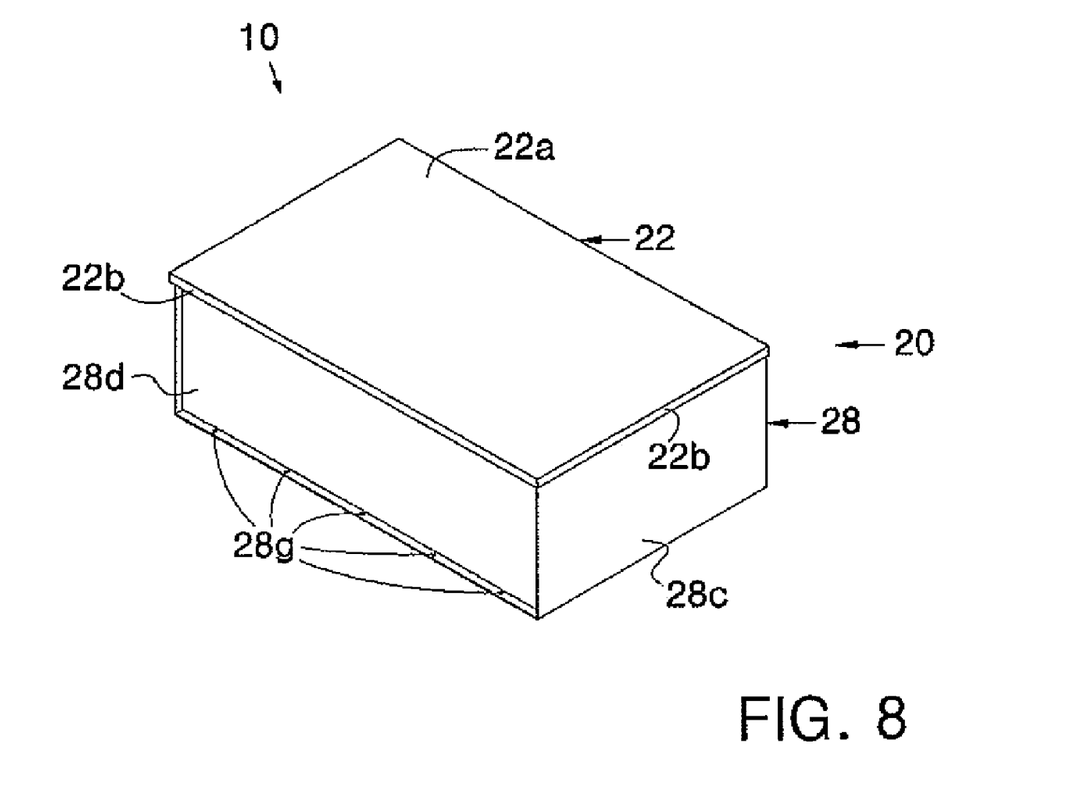
FIG. 8 is a perspective view of the shelter of the portable and collapsible housing in the collapsed configuration for shipping or storage according to an embodiment of the present invention.

FIGS. 6-8 illustrate a process by which portable and collapsible housing 10 may be transformed into a single collapsed box shaped container configuration for convenient and efficient shipping or storage.

As discussed above, front shelter 24 is configured and dimensioned to fit between back shelter first end wall 28a and back shelter second end wall 28c of back shelter 28. Back shelter first end wall 28a and back shelter second end wall 28c together form two opposite sides of a box shaped container. Similarly, upper platform 24d and lower platform 28d together form two opposite sides of the box shaped container. Shelter back wall 28b serves as the bottom for said box shaped container with shelter front wall 24b resting on the bottom, i.e., shelter back wall 28b. Shelter roof 22 is configured to serve as a cover for the box shaped container. In this way shelter roof 22 is dual configured to serve as the roof for assembled housing 10 and as the cover for collapsed housing 10.

Once the four sided box shaped container is formed by inserting front shelter 24 into back shelter 28, other components of the present invention including base cage 60, door apparatus 40, and cantilevered rods 80 are placed in said box shaped container for shipping or storage.

FIGS. 6 and 7 illustrate how base cage 60 may be folded into portable and collapsible housing 10 for shipping or storage in said box shaped container. As discussed above, back cage 68 is configured and dimensioned to overlap end walls 64a and 64c of front cage 64 when cage front wall 64b is positioned face down with front cage end walls 64a and 64c positioned vertically upward and perpendicular to cage front wall 64b. Thus, when back cage first end wall 68a and back cage second end wall 68c of back cage 68 overlap front cage first end wall 64a and front cage second end wall 64c of front cage 64, base cage 60 in this collapsed configuration can be placed into said box shaped container by slidably inserting collapsed base cage 60 between front shelter first end wall 24a, front shelter second end wall 24c, lower platform 28d and upper platform 24d for convenient shipping or storage.

FIG. 7 illustrates an additional useful feature of the present invention which is the utilization of space within the interior of collapsed base cage 60 for shipping or storing door apparatus 40 and cantilevered rods 80. Said space may also be used to ship or store other articles for poultry or other animal care such as an animal feed container or an animal water container of known type.

Though front cage first end wall 64a and second end wall 64c are presented so they remain substantially perpendicular to cage front wall 64b when collapsed for shipping or storage, it should be understood that front cage 64 could be constructed so walls 64a and 64c are pivotally foldable with or are separable from cage front wall 64b to enable each wall to rest against cage front wall 64b when collapsed for shipping or storage. Similarly, though back cage first end wall 68a and back cage second end wall 68c are presented so that they remain substantially perpendicular to cage back wall 68b when collapsed for shipping or storage, it should be understood that back cage 68 could be constructed so walls 68a and 68c are pivotally foldable with or are separable from cage back wall 68b to enable each wall to rest flat against cage back wall 68b when collapsed for shipping or storage.

Though front cage 64 and back cage 68 are presented as two integrated C-shaped components that are joined to one another to form four sides of base cage 60, it should be understood that base cage 60 could be constructed with four separate sides that can be joined together to form four sides of base cage 60. Said four separate sides can then be shipped or stored laying flat in said box shaped container formed by front shelter 24 and back shelter 28.

Though front cage 64 and back cage 68 are presented as two integrated C-shaped components that are joined to one another to form four sides of base cage 60, it should be understood that base cage 60 could be constructed where at least two cage walls collapse and fold inward in an accordion like manner for shipping or storage.

In addition as depicted in FIG. 8, shelter roof 22 is also dimensionally configured to rest horizontally on front shelter 24 and back shelter 28 when in the collapsed box shaped container configuration thereby additionally serving as a lid for said box shaped container.

While certain novel features of this invention have been shown and described and are pointed out in the annexed claim, it is not intended to be limited to the details above, since it will be understood that various omissions, modifications, substitutions and changes in the forms and details of the structure illustrated and its operation can be made by those skilled in the art without departing in any way from the spirit of the present invention.

What is claimed is:

1. A housing for poultry or other animals, said housing comprising:
    a shelter portion having a shelter portion interior and a top rim defining a first opening and said shelter portion having a bottom in the form of a half-lap configuration;
    a cage portion, said cage portion having a cage portion interior defined by at least one cage wall, said cage portion having a half-lap configuration complementary to said half-lap configuration of said shelter portion, and wherein said at least one cage wall comprises wire or mesh material;
    said shelter portion being affixed to said cage portion, wherein said shelter portion interior and said cage portion interior are in communication with one another;
    said shelter portion further including a second opening wherein said shelter portion interior is in communication with said cage portion interior;
    said cage portion further comprising a ramp that slopes up toward said second opening of said shelter portion; and
    a shelter roof disposed on said top rim of said shelter portion, wherein said roof covers said first opening.

2. The housing of claim 1 further comprising a door frame and at least one door and wherein said door frame is affixed within said second opening of said shelter portion.

3. The housing of claim 2 wherein said door frame comprises a plurality of grooves, said grooves being disposed horizontally and dimensioned and configured to slidably engage said at least one door.

4. The housing of claim 2 wherein said at least one door comprises two doors.

5. The housing of claim 2, wherein said at least one door includes a door handle portion attached thereto.

6. The housing of claim 2 wherein said door frame and said at least one door is of a plastic construction.

7. The housing of claim 1 wherein said shelter portion further comprises at least one cantilevered rod disposed substantially within said shelter portion interior.

8. The housing of claim 7 wherein said at least one cantilevered rod is of a plastic construction.

9. The housing of claim 1 wherein said shelter portion is affixed to said cage portion in a detachable manner.

10. The housing of claim 1 wherein said shelter portion comprises a front shelter portion, and a back shelter portion, said front shelter portion being detachably affixed to said back shelter portion, wherein said front shelter portion and back shelter portion each have an open portion defined by said top rim and three vertical sides forming a C-shape.

11. The housing of claim 10 wherein said back shelter portion is larger than said front shelter portion in at least one dimension.

12. The housing of claim 1 wherein said shelter roof has a rectangular shelter roof top and peripheral shelter roof lips perpendicularly extending downward from said shelter roof top wherein said shelter roof is detachably affixed to said top rim and wherein said shelter roof is movable between an open and closed position.

13. The housing of claim 1 wherein said cage portion comprises a front cage portion, and a back cage portion, and wherein said front cage portion is detachably affixed to said back cage portion, wherein said front cage portion and said back cage portion each having a box shape with one open portion, three vertical sides, one open bottom, and one open side forming a C-shape.

14. The housing of claim 13 wherein said front cage portion is larger than said back cage portion in at least one dimension.

15. The housing of claim 1 wherein said cage portion further comprises a cage door opening, a movable cage door, and a cage door locking mechanism for locking said movable cage door, wherein said cage door opening defines an opening wherein said cage portion interior is in communication with an exterior environment.

16. The housing of claim 15 wherein said cage portion further comprises a cage front wall wherein said cage door opening is positioned within a lower left or right portion on said cage front wall.

17. The housing of claim 1 wherein said shelter portion is transformable into a box-shaped container for shipping or storage.

18. The housing of claim 17 wherein said cage portion is transformable into a shape which fits within said box-shaped container for shipping or storage.

19. The housing of claim 1 wherein said shelter portion is of a plastic construction.

20. The housing of claim 1 wherein said shelter roof is at least partially comprised of translucent or transparent plastic.

* * * * *